H. B. FOULDER.
TOOL FOR TWISTING WIRE TIES.
APPLICATION FILED MAR. 29, 1919.
1,341,459.
Patented May 25, 1920.
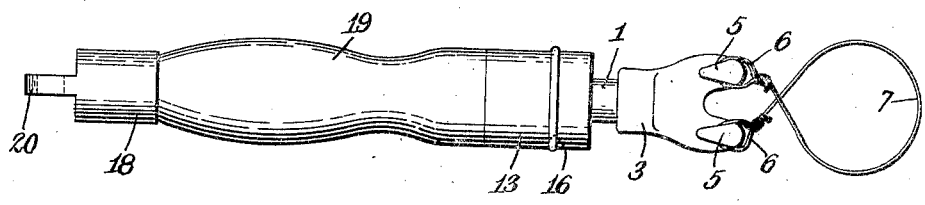
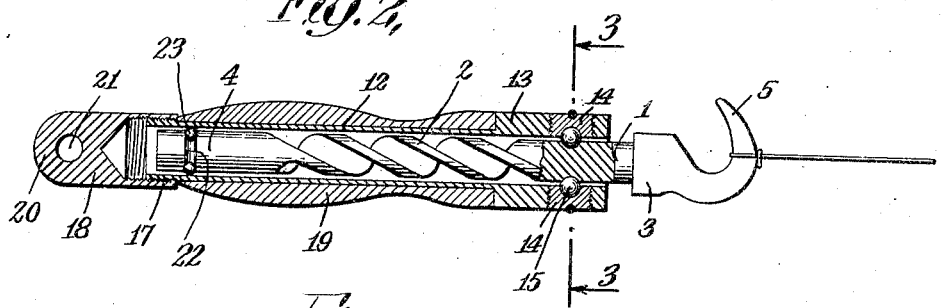
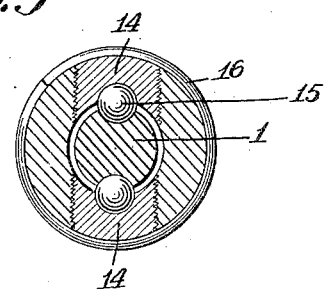
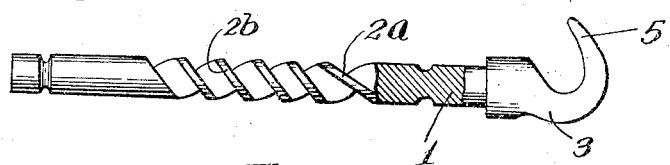
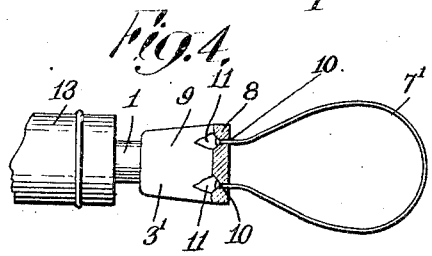
INVENTOR
Henry B. Foulder
BY
ATTORNEY

UNITED STATES PATENT OFFICE.

HENRY B. FOULDER, OF BROOKLYN, NEW YORK, ASSIGNOR TO J. P. CURRY M'F'G CO., INC., OF NEW YORK, N. Y., A CORPORATION OF NEW YORK.

TOOL FOR TWISTING WIRE TIES.

1,341,459.   Specification of Letters Patent.   Patented May 25, 1920.

Application filed March 29, 1919. Serial No. 285,963.

*To all whom it may concern:*

Be it known that I, HENRY B. FOULDER, a citizen of the United States, residing at Brooklyn, in the county of Kings, city and State of New York, have invented certain new and useful Improvements in Tools for Twisting Wire Ties, of which the following is a specification.

My invention relates to tools for twisting wire ties about the neck of a bag or sack for closing the same. My device is in some respects an improvement upon that described in patent to J. P. Curry, 908,649. The objects of my invention are to provide an efficient, simple and durable device of the character referred to and particularly one which is compact, in which the mechanism is protected to a considerable degree against dust, and which is readily taken apart and cleaned.

In devices of this character previously constructed the twisting head is provided on the end of a spiral spindle which extends entirely through the handle member and projects some distance to the rear of the latter, the spindle being rotated by the longitudinal movement of the handle thereon, rotation being imparted to the spindle by the engagement with the spiral groove thereof of a member in the nature of a nut on the handle, through which the spindle passes. With such a device it is exceedingly difficult to keep the spindle and the bore in which it moves clean, especially in establishments such as cement mills in which such tying tools are largely used. I have largely overcome this difficulty and produced a very compact and simple device by closing the rear end of the bore which extends through the handle member and mounting within the bore a short spindle which is inclosed thereby and revolubly reciprocates therein. The rotation of this spindle is provided by removably mounting in the handle member adjacent the forward end thereof means which extend into the bore and engage within the spiral groove of the spindle. This removably mounted inwardly projecting means preferably takes the form of an anti-friction bearing device, such as a pair of balls seated in bearing blocks which are threaded into the handle member. The shank of the spindle is preferably formed with a cylindrical portion to the rear of the spiral groove, which slidably engages within the bore of the handle, anti-friction bearing means being provided at this point if desired. The balls at the forward end of the handle act as a bearing means and serve to impart rotation to the spindle when the handle is reciprocated. The balls may also act as a stop to prevent the spindle from coming entirely out of the handle, because of their engagement with the cylindrical portion at the rear of the spindle. When the device is to be taken apart for cleaning it is only necessary to unscrew the bearing blocks in which the balls are mounted.

In order that my invention may be more clearly understood, attention is hereby directed to the accompanying drawings forming part of this application and illustrating certain embodiments of my invention. In the drawings Figure 1 represents a side elevation of a tool of the character referred to; Fig. 2 is a longitudinal section through the same, certain parts being shown in side elevation; Fig. 3 is a cross section taken on line 3—3 of Fig. 2, on an enlarged scale; Fig. 4 is a partial side elevation of a modified form of my invention; and Fig. 5 is a side elevation, partly shown in section, of a modified form of twisting spindle.

Referring to the drawings the spindle 1 is provided with a longitudinally extending spiral groove 2 which extends rearwardly from the twisting head 3, or from a point adjacent thereto, to a point somewhat forwardly of the rear end of the spindle, the rear portion 4 of the spindle being cylindrical in form. The twisting head 3 may be of approved form, such as that shown in Figs. 1 and 2 hereof and described in Patent No. 908,649 referred to. As is shown the head 3 may be provided with two hooks 5, 5, projected at equal distances from the center line of the spindle upon the same side of the head and at a suitable distance apart to engage the eyes 6, 6, upon the ends of a wire tie 7. In Fig. 4 the spindle 1 is shown as provided with a twisting head 3' of different form, in which the portion 8 is rounded or bent transversely at an angle to the direction of the portion 9 of the head, two narrow notches 10, 10, being cut lengthwise to the portion 8 of the head. The end portions of a wire tie 7' are received in these notches 10, enlargements on the end of the wire tie being received in the flaring ends 11, 11, of the notches 10.

The handle member comprises a tubular portion 12 which is open at both ends and is preferably provided with a portion 13 of enlarged outer diameter adjacent its forward end. A suitable number, such as two, screw plugs 14, 14, are threaded into suitable openings formed in this enlarged portion 13 of the handle, these screw plugs having seats in which the balls 15 are adapted to be rotatably mounted. The screw plugs 14 may be held more securely in position by means of a snap-ring 16 which may be mounted in a groove extending around the portion 13 of the handle member and in slots in the outer ends of the screw plugs 14.

The rear end of the tubular member 12 is preferably provided with an external screw-thread 17 on which the rear closure member 18 may be screwed. A hand grip 19, which may be of wood or other suitable material, is mounted upon the tubular handle member 12 to the rear of the forward enlargement 13 thereof, the rear closure member 18 being screwed into firm contact with the rear end of this. The closure member 18 may be provided with a flattened rearwardly extending portion 20 through which extends an opening 21. This may be used for securing the tool by a cord or chain to the belt of the operator, this taking the place of the connection which is usually made in the tools previously constructed from the rear end of the spindle to the belt of the operator.

In operation, when the loops or end portions of the wire tie have been secured to the twisting head it is only necessary to pull the handle rearwardly to twist the wire tie in the desired manner. After the wire tie has been removed from the twisting head, the spindle may be returned to its position within the handle by simply holding the tool vertically with the twisting head uppermost, the spindle moving very easily on the ball bearings provided. When it is desired to clean the tool, it is only necessary to remove the snap-ring 16 and unscrew the plugs 14 to remove the balls 15 so that the cylindrical portion 4 of the spindle will clear the balls. Easy access may also be had to the bore of the tool for cleaning the same by unscrewing the rear closure 18.

If desired, an anti-friction bearing may be provided at the rear portion of the spindle, as is indicated in Fig. 2. As is there shown, a groove 22 may be formed circumferentially in the cylindrical portion 4 of the spindle, suitable to hold a plurality of balls 23, which will rotatably engage the bore of handle member 12. These balls may be dropped through the opening in which one of the plugs 14 seats, after the plug has been removed and the spindle has been positioned with the groove 22 in alinement with the opening.

A modified form of spindle is shown in Fig. 5. With the form of spindle shown in Fig. 2 it is advisable for the workman to first cross the ends of the wire tie 7, as shown, before operating the tool, since otherwise considerable power is required at the start. In the arrangement shown in Fig. 5 the spindle is given a spiral groove portion $2^a$ for a distance from the twisting head 3, which portion is of a rather gradual pitch, and may extend for about one revolution of the spiral. To the rear of this portion $2^a$ the pitch of the spiral becomes considerably steeper, as is indicated at $2^b$. With this arrangement the ends of the wire tie need not first be crossed before the twisting is started, and comparatively little power will be required to give the first turn to the wire. The twisting having thus been started easily, the remainder of the twisting may be quickly performed by the steeper portion $2^b$ of the spiral, less power being required to twist the wire after the first turn has been accomplished.

What I claim is:

1. In a tool for twisting wire ties, the combination of a handle member having an axial bore, entirely closed at the rear, means removably secured to said member adjacent the forward end thereof to project into said bore, and a spindle having a twisting head and a shank adapted to slidably engage in said bore, said shank having a spiral groove formed on the forward portion thereof in which said inwardly-projecting means is adapted to engage, said shank having a cylindrical portion to the rear of said spiral groove, adapted to slidably engage in said bore, said inwardly-projecting means forming a stop to prevent the spindle from coming out of the handle member when said means engage said cylindrical portion at the rear of said groove, and said shank being adapted to be entirely removed from the front end of said handle member when said inwardly-projecting means is removed.

2. In a tool for twisting wire ties, the combination of a handle member having an axial bore, means removably secured to said member adjacent the forward end thereof and carrying anti-friction balls arranged to project into said bore, and a spindle having a twisting head and a shank adapted to slidably engage in said bore, said shank having a spiral groove formed on the forward portion thereof in which said balls are adapted to rotatably engage, said shank having a cylindrical portion to the rear of said spiral groove, and anti-friction bearing means for said cylindrical portion.

3. In a tool for twisting wire ties, the combination of a handle member having an axial bore entirely closed at the rear, and openings through its walls adjacent the forward end thereof, screw-plugs mounted in said openings and carrying anti-friction balls arranged to project into said bore, and a spindle having a twisting head and a shank adapted to slidably engage in said bore, said shank having a spiral groove formed on the forward portion thereof in which said balls are adapted to rotatably engage, and a cylindrical portion to the rear of said groove, adapted to slidably engage in said bore, said shank being adapted to be entirely removed from the front end of said handle member when said screw plugs and balls are removed.

4. In a tool for twisting wire ties, the combination of a tubular handle member open at both ends, having an enlargement adjacent its forward end, a closure member screw-threaded on the rear end of said handle member, adapted to be connected to the belt of the operator, a hand grip secured on said handle member between said enlargement and closure, bearing-seat means removably secured in said enlargement, anti-friction balls mounted in said bearing-seat means to project into said bore, and a spindle having a twisting head and a shank adapted to slidably engage in said bore, said shank having a spiral groove formed thereon in which said balls are adapted to rotatably engage.

This specification signed and witnessed this 14th day of March, 1919.

HENRY B. FOULDER.

Witnesses:
DYER SMITH,
I. McINTOSH.